US011118958B2

(12) United States Patent
Weigl et al.

(10) Patent No.: US 11,118,958 B2
(45) Date of Patent: Sep. 14, 2021

(54) SYSTEM FOR DETERMINING A FILLING LEVEL IN A FUEL TANK

(71) Applicant: Continental Automotive GmbH, Hannover (DE)

(72) Inventors: Manfred Weigl, Sinzing (DE); Harry Schüle, Neunburg V. Wald (DE); Lamproula Charmpa, Regensburg (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 162 days.

(21) Appl. No.: 16/062,881

(22) PCT Filed: Nov. 24, 2016

(86) PCT No.: PCT/EP2016/078732
§ 371 (c)(1),
(2) Date: Jun. 15, 2018

(87) PCT Pub. No.: WO2017/102281
PCT Pub. Date: Jun. 22, 2017

(65) Prior Publication Data
US 2019/0011305 A1    Jan. 10, 2019

(30) Foreign Application Priority Data

Dec. 17, 2015 (DE) ...................... 10 2015 225 754.1

(51) Int. Cl.
*G01F 23/14* (2006.01)
*B60K 15/03* (2006.01)

(52) U.S. Cl.
CPC .............. *G01F 23/14* (2013.01); *B60K 15/03* (2013.01); *B60K 2015/03361* (2013.01)

(58) Field of Classification Search
CPC ................................ G01F 23/14; G01F 22/02
See application file for complete search history.

(56) References Cited

U.S. PATENT DOCUMENTS

| 3,744,306 A | * | 7/1973 | Krueger | ................... G01F 17/00 73/149 |
| 5,245,870 A | * | 9/1993 | Hartel | ................... B60K 15/061 73/149 |

(Continued)

FOREIGN PATENT DOCUMENTS

| CN | 103547894 A | 1/2014 | ............... G01F 1/34 |
| CN | 104704329 A | 6/2015 | ............. G01F 23/22 |

(Continued)

OTHER PUBLICATIONS

International Search Report and Written Opinion, Application No. PCT/EP2016/078732, 12 pages, dated Feb. 9, 2017.

(Continued)

*Primary Examiner* — Nathaniel J Kolb
(74) *Attorney, Agent, or Firm* — Slayden Grubert Beard PLLC

(57) ABSTRACT

Some embodiments may include a system for determining a filling level of a fuel situated in a fuel tank comprising: an air pump; a valve; a pressure sensor; a control unit; a timing element; and a control unit. The control unit may be programmed to actuate the valve to close the fuel tank and subsequently actuate the air pump to increase a pressure in the fuel tank until an upper threshold is reached. The timing element may determine the time required for the pressure to reach the upper threshold. The control unit may calculate the filling level of the fuel based on the time taken to reach the upper threshold.

8 Claims, 3 Drawing Sheets

(56) References Cited

U.S. PATENT DOCUMENTS

| | | | | |
|---|---|---|---|---|
| 6,036,296 A | * | 3/2000 | Axtell | B41J 2/17513 |
| | | | | 347/7 |
| 9,880,043 B2 | | 1/2018 | Ochiai et al. | |
| 10,060,781 B2 | * | 8/2018 | Nguyen | G01F 22/02 |
| 2012/0260998 A1 | | 10/2012 | Rodgers | 137/14 |
| 2016/0167510 A1 | * | 6/2016 | Weigl | F02M 25/089 |
| | | | | 73/49.2 |
| 2017/0038238 A1 | * | 2/2017 | Nguyen | G01F 23/0076 |

FOREIGN PATENT DOCUMENTS

| | | | | |
|---|---|---|---|---|
| DE | 1931583 A1 | 12/1970 | | G01F 23/18 |
| DE | 19750620 A1 | 6/1999 | | B60K 15/06 |
| EP | 0503279 A1 | 9/1992 | | B60K 15/06 |
| WO | 2017/102281 A1 | 6/1917 | | B60K 15/03 |
| WO | WO-2014187639 A1 * | 11/2014 | | F02M 25/0818 |

OTHER PUBLICATIONS

Chinese Office Action, Application No. 201680074017.9, 17 pages, dated Jun. 22, 2020.

\* cited by examiner

SYSTEM FOR DETERMINING A FILLING LEVEL IN A FUEL TANK

CROSS-REFERENCE TO RELATED APPLICATIONS

This application is a U.S. National Stage Application of International Application No. PCT/EP2016/078732 filed Nov. 24, 2016, which designates the United States of America, and claims priority to DE Application No. 10 2015 225 754.1 filed Dec. 17, 2015, the contents of which are hereby incorporated by reference in their entirety.

TECHNICAL FIELD

The present disclosure relates to fluid tanks. Various embodiments may include a system for determining a filling level of a fuel situated in a fuel tank.

BACKGROUND

To reduce the pollutant emissions originating from motor vehicles, numerous measures have been introduced in recent decades. One of these measures consists in using a fuel tank system in which a fuel tank is connected to an accumulator element for temporarily storing hydrocarbons. During the refuelling of motor vehicles with fuels, outgassing of hydrocarbons from the fuel occurs. The accumulator is to ensure that the hydrocarbons do not pass into the atmosphere. Increased outgassing of hydrocarbons from the fuel also occurs in the presence of high temperatures or when traveling over uneven ground, wherein it must be effectively ensured that said hydrocarbons do not escape into the atmosphere. In particular in the case of hybrid vehicles in which the internal combustion engine is completely shut down over large traveling distances, outgassed hydrocarbons must be temporarily stored in an effective manner in order to be burned at a later point in time upon a restart of the internal combustion engine.

For this purpose, fuel tank systems have become established which are composed of a fuel tank and of an accumulator element for the temporary storage of hydrocarbons, wherein the fuel tank and the accumulator element are connected to one another such that the hydrocarbons that are outgassed from a fuel situated in the fuel tank are stored in the accumulator element, wherein the accumulator element is connected to a first line through which fresh air can be conveyed to the accumulator element, and the accumulator element is connected to a second line, which connects the accumulator element to an intake line and through which fresh air enriched with hydrocarbons can be conveyed from the accumulator element to the intake line.

In this way, the accumulator element can be cyclically purged with fresh air, and the stored hydrocarbons can be fed to an intake line which connects the internal combustion engine to the air filter and which supplies air for combustion to the internal combustion engine. It is thus possible for the hydrocarbons outgassed from the fuel tank to be burned in the internal combustion engine, and an escape of the hydrocarbons into the atmosphere is reliably prevented. To ensure fault-free functioning of the fuel tank system, it is necessary for the leak-tightness of the entire fuel tank system to be checked at regular intervals. This leak-tightness checking cannot be limited to when the motor vehicle visits a workshop; rather, the leak-tightness checking must be performed in the vehicle, that is to say on-board, as part of the overall driving operation of the motor vehicle. For this purpose, in the motor vehicle, there is installed a system composed of air pumps, pressure sensors and valves which can perform an on-board check of the leak-tightness of the fuel tank system.

Systems for determining the filling level of liquid situated in tanks have been known for a long time. In general, systems use floats which float on the liquid and are connected to a sensor arrangement which detects the position of the float, whereby the filling level of the liquid in the tank is determined. These systems are composed of a number of components, which entail costs, which may exhibit faults, and which introduce additional weight into the tank or the tank system.

SUMMARY

It is therefore an object of the present disclosure to enable an inexpensive system for determining the filling level of a fuel situated in a fuel tank. For example, some embodiments may include a system for determining a filling level of a fuel situated in a fuel tank, characterized in that the system has an electromotively driven air pump, at least one valve, a pressure sensor, a control unit and a timing element. A control unit actuates the valve such that the fuel tank is closed in pressure-tight fashion, and the control unit actuates the air pump such that the pressure in the fuel tank increases until an upper threshold is reached, and the timing element determines the time until the pressure has reached the upper threshold, and the filling level of the fuel situated in the fuel tank is determined from the time taken to reach the upper threshold.

In some embodiments, the timing element starts the timing when the pressure in the fuel tank has exceeded a lower threshold.

In some embodiments, the control unit actuates the air pump at the same operating point for every determination of the filling level.

In some embodiments, the system has a temperature sensor, by means of the measurement values of which the determination of the filling level is corrected by a temperature coefficient.

In some embodiments, the system has an ambient pressure sensor, by means of the measurement values of which the determination of the filling level is corrected by an ambient pressure coefficient.

As another example, some embodiments include a method for determining a filling level of a fuel situated in a fuel tank, characterized in that a system for determining the filling level has an electromotively driven air pump, at least one valve, a pressure sensor, a control unit and a timing element. A control unit actuates the valve such that the fuel tank is closed in pressure-tight fashion, whereupon the control unit actuates the air pump such that the pressure in the fuel tank is increased until an upper threshold is reached, and the timing element determines the time until the pressure has reached the upper threshold, and the filling level of the fuel situated in the fuel tank is determined from the time taken to reach the upper threshold.

In some embodiments, the timing element starts the timing when the pressure in the fuel tank has exceeded a lower threshold.

In some embodiments, the control unit actuates the air pump at the same operating point for every determination of the filling level.

In some embodiments, the system has a temperature sensor, by means of the measurement values of which the determination of the filling level is corrected by a temperature coefficient.

In some embodiments, the system has an ambient pressure sensor, by means of the measurement values of which the determination of the filling level is corrected by an ambient pressure coefficient.

BRIEF DESCRIPTION OF THE DRAWINGS

An example embodiment is described below on the basis of the figures, in which.

DETAILED DESCRIPTION

By virtue of the fact that the system has an electromotively driven air pump, at least one valve, a pressure sensor, a control unit and a timing element, wherein a control unit actuates the valve such that the fuel tank is closed in pressure-tight fashion, and the control unit actuates the air pump such that the pressure in the fuel tank increases until an upper threshold is reached, and the timing element determines the time until the pressure has reached the upper threshold, and the filling level of the fuel situated in the fuel tank is determined from the time taken to reach the upper threshold, no further components, such as for example floats or position sensors, are necessary to detect the filling level. The system for determining the filling level can therefore be realized inexpensively.

The same advantages apply to the methods described herein, in which a system for determining the filling level has an electromotively driven air pump, at least one valve, a pressure sensor, a control unit and a timing element, wherein a control unit actuates the valve such that the fuel tank is closed in pressure-tight fashion, whereupon the control unit actuates the air pump such that the pressure in the fuel tank is increased until an upper threshold is reached, and the timing element determines the time until the pressure has reached the upper threshold, and the filling level of the fuel situated in the fuel tank is determined from the time taken to reach the upper threshold.

In some embodiments, the timing element begins the timing when the pressure in the fuel tank has exceeded a lower threshold. Thus, an exactly defined starting point for the time measurement is defined, which leads to highly accurate measurement results.

In some embodiments, the control unit actuates the air pump at the same operating point for every determination of the filling level. This measure leads to very good reproducibility of the filling level determination, and to accurate measurement results.

In some embodiments, the system has a temperature sensor, by means of the measurement values of which the filling level determination is corrected by a temperature coefficient. The known physical relationships between gas pressure, gas temperature and gas volume can be utilized here in order, on the basis of the timing values, in the case of varying temperature, to make accurate statements regarding the fraction of the gas volume and thus the filling level of the fuel.

In some embodiments, the system has an ambient pressure sensor, by means of the measurement values of which the filling level determination is corrected by an ambient pressure coefficient. The ambient pressure can also influence the accuracy of the filling level determination, and this can be compensated by means of a corresponding correction.

Figure 1:
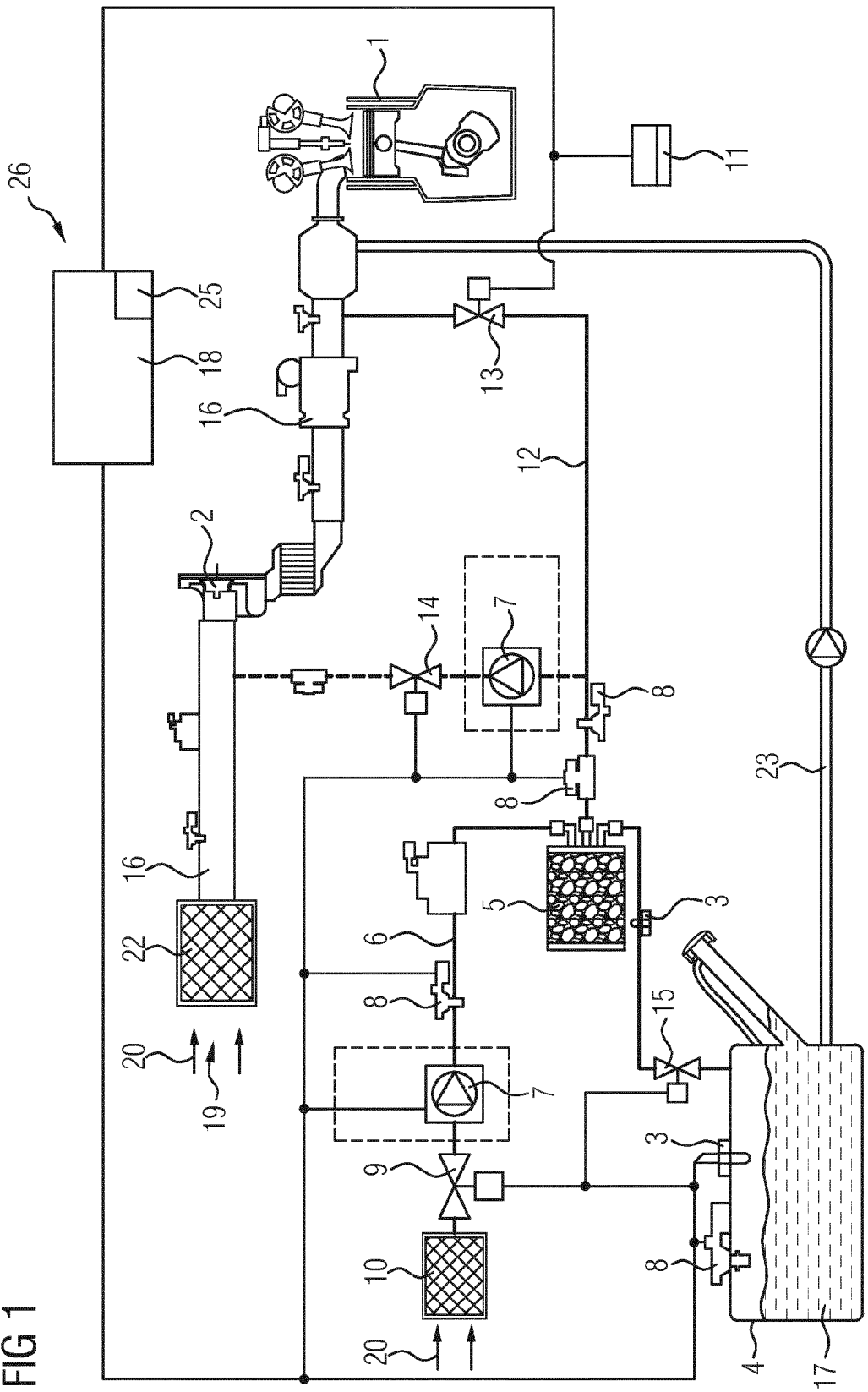
FIG. 1 shows an internal combustion engine with fuel tank system, according to teachings of the present disclosure.

FIG. 1 shows an internal combustion engine 1 according to the teachings of the present invention. The internal combustion engine 1 is fed with fresh air 20 via an intake line 16. Proceeding from the fresh-air side 19, fresh air 20 is conducted via an air filter 22 into the intake line 16, and possibly compressed by means of an exhaust-gas turbocharger 2 or a supercharger, and then supplied to the combustion chambers of the internal combustion engine 1. Furthermore, the internal combustion engine 1 is supplied with fuel 17 from the fuel tank 4 via a fuel line 23.

FIG. 1 furthermore shows the fuel tank system 26 with a fuel tank 4 and with an accumulator element 5 for temporarily storing hydrocarbons. The fuel tank 4 and the accumulator element 5 are connected to one another such that the hydrocarbons that are outgassed from a fuel 17 situated in the fuel tank 4 can be stored in the accumulator element 5.

The accumulator element 5 may for example comprise an activated carbon accumulator. An activated carbon accumulator may include a closed canister in which carbon is arranged such that the hydrocarbons to be stored accumulate on the carbon. such an accumulator element 5, however, has a limited storage capacity, such that the accumulator element 5 must be emptied at regular intervals by virtue of fresh air 20 being drawn in, for example via a purge air filter 10, and forced via a first line 6 into the accumulator element 5 by means of an air pump 7.

The fresh air 20 flows through the activated carbon in the accumulator element 5 and, in the process, absorbs hydrocarbons, after which the fresh air 20 enriched with the hydrocarbons is conveyed along a second line 12 to the intake air line 16. In the intake air line 16, the fresh air 20 enriched with the hydrocarbons mixes with the fresh air 20 drawn in via the air filter 22. The hydrocarbons 24 can thus be supplied to the internal combustion engine 1, where the hydrocarbons are burned in the combustion chambers of the internal combustion engine 1.

Since the fuel tank system 26 contains highly volatile hydrocarbons, it is necessary for the leak-tightness of the fuel tank system 26 to be checked at regular intervals. For the purposes of checking the leak-tightness, the fuel tank system 26 illustrated in FIG. 1 includes a first valve 9 arranged in the first line 6 upstream of the accumulator element 6 in the direction of the fresh-air flow. An air pump 7 is arranged between the first valve 9 and the accumulator element 5 and a second valve 13 is arranged in a second line 12 between the accumulator element 5 and the intake line 16.

For the checking of the leak-tightness of the fuel tank system 26, the first valve 9 arranged in the first line 6 may be opened and the second valve 13 may be closed. A fourth valve 15 that is shown here may be opened, whereas the optionally provided third valve 14 may be closed. Then, by means of the air pump 7, a positive pressure is built up in the fuel tank 4, which positive pressure can be observed by means of the pressure sensor 8. Here, the pressure sensor 8 may be arranged for example in the fuel tank 4, in the first line 6, and/or in the second line 12.

After a predetermined positive pressure has been reached, the first valve 9 may also be closed, and the progression of the positive pressure in the fuel tank 4 over time can be tracked by means of the pressure sensor 8. For this purpose, a timing element 25 is formed in a control unit 18. If the positive pressure in the fuel tank 4 rapidly falls, a leak in the fuel tank system 26 can be inferred. The gradient of the pressure drop provides information regarding the magnitude of the leak. The control unit 18 is connected by means of electrical lines to the drives of the first valve 9, of the second valve 13, of the third valve 14 and of the fourth valve 15, and to the pressure sensors 8, to the air pump 7, to the ambient pressure sensor 11 and to the temperature sensor 3. Furthermore, with the system illustrated in FIG. 1, a determination of a filling level of the fuel 17 situated in the fuel tank 4 can be performed. For this purpose, the second valve 13 and the optionally provided third valve 14 are closed, in order that the fuel tank 4 is closed in pressure-tight fashion. By contrast, the first valve 9 and the fourth valve 15 are opened, in order that fresh air can be forced into the fuel tank 4 by means of the air pump 7. The control unit 18 actuates the air pump 7 such that the pressure in the fuel tank 4 increases until an upper threshold 24 is reached.

The timing element 25 determines the time until the pressure has reached the upper threshold 24 and the control unit 18 can determine the filling level of the fuel 17 situated in the fuel tank 4 from the time taken to reach the upper threshold value 25.

The timing element 25 may begin the timing when the pressure in the fuel tank 4 has exceeded a lower threshold 21. In order that the timing can be better evaluated, the control unit 18 actuates the air pump at the same operating point for every determination of the filling level.

For example, if an electromotively driven radial pump is used, the operating point would be a precisely defined rotational speed at which the air pump 7 is operated every time for every determination of the filling level. Electromotively driven radial pumps can reach rotational speeds of 60,000 revolutions per minute. Some embodiments may use a rotational speed of 25,000 RPM. In this way, exactly defined boundary conditions are produced, which are advantageous for a reproducible and error-free determination of the filling level.

Also shown in FIG. 1 is a temperature sensor, by means of the measurement values of which the determination of the filling level can be corrected by a temperature coefficient. The generally known relationships between gas pressure, gas temperature, and gas volume can be taken into consideration for the determination of the filling level of the fuel 17 situated in the fuel tank 4, because one part of the fuel tank 4 is filled with the gas volume and the other part of the fuel tank is filled with the fuel volume. Furthermore, the system has an ambient pressure sensor 11, by means of the measurement values of which the filling level determination can be corrected by an ambient pressure coefficient.

Figure 2:
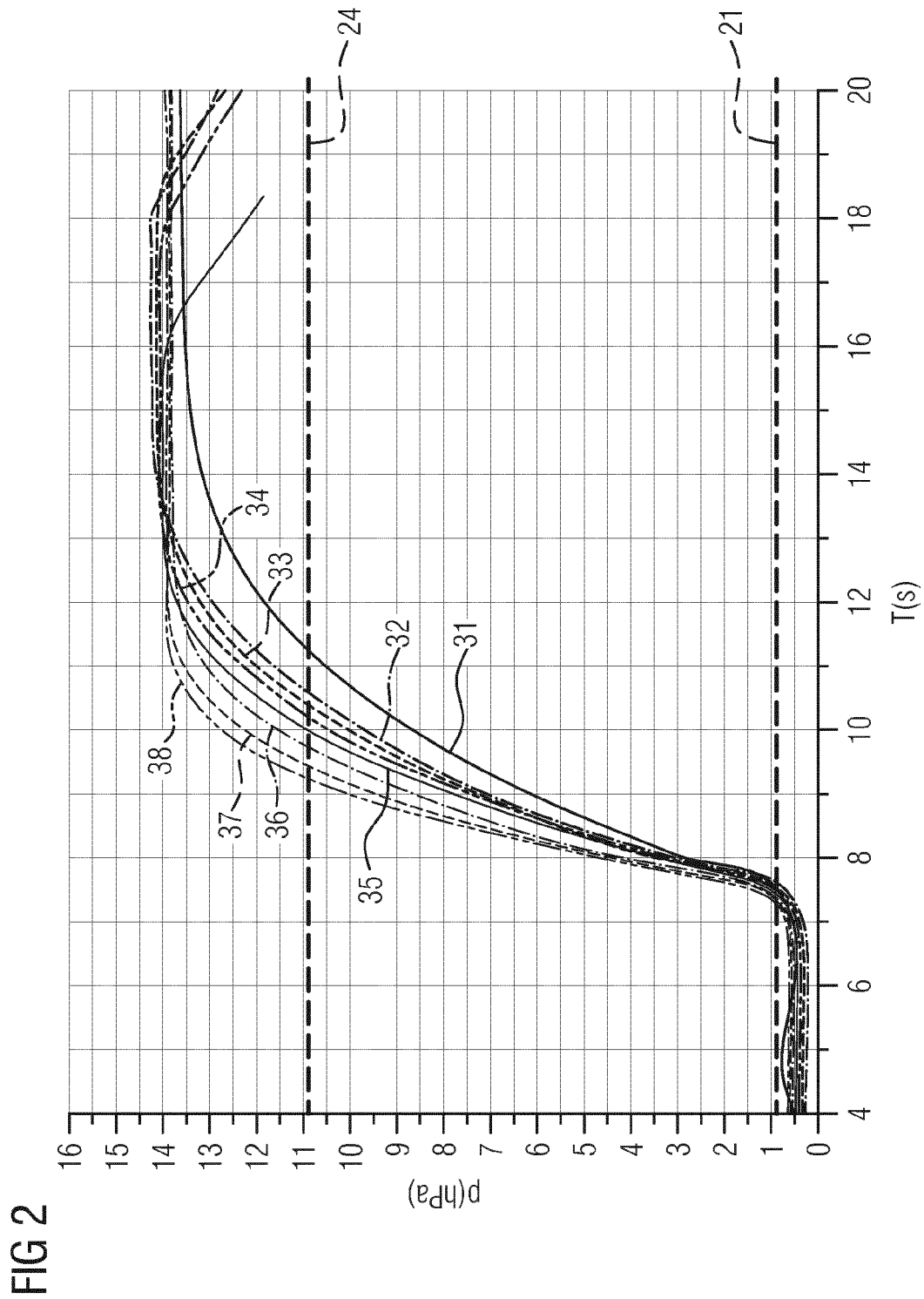
FIG. 2 shows a pressure-time diagram, according to teachings of the present disclosure.

FIG. 2 shows a pressure P-time T diagram. The pressure P is indicated in hPa, and the time T in s. In the pressure P-time T diagram, there are a first pressure curve 31, a second pressure curve 32, a third pressure curve 33, a fourth pressure curve 34, a fifth pressure curve 35, a sixth pressure curve 36, a seventh pressure curve 37, and an eighth pressure curve 38. The pressure curves 31 to 38 rise at different rates, and each represents a different filling level of the tank. The time required to reach a preset upper pressure threshold 24 is measured. Here, it may be advantageous for the air pump 7 to always operate at one and the same operating point for every measurement. To set the most similar possible starting conditions, the timing may be started when a predetermined lower pressure threshold value 21 has been exceeded in the fuel tank 4.

In the case of the first pressure curve 31, the greatest length of time passes until the pressure has risen from the lower pressure threshold 21 to the upper pressure threshold 24. It has thus been necessary for the greatest gaseous volume in the fuel tank 4 to be filled, and the first pressure curve 31 thus represents the lowest fuel filling level in the fuel tank 4. By contrast, in the case of the eighth pressure curve 38, the smallest length of time passes until the pressure has risen from the lower pressure threshold 21 to the upper pressure threshold 24. It has thus been necessary for the smallest gaseous volume in the fuel tank 4 to be filled, and the eighth pressure curve 31 thus represents the greatest fuel filling level in the fuel tank 4.

Figure 3:
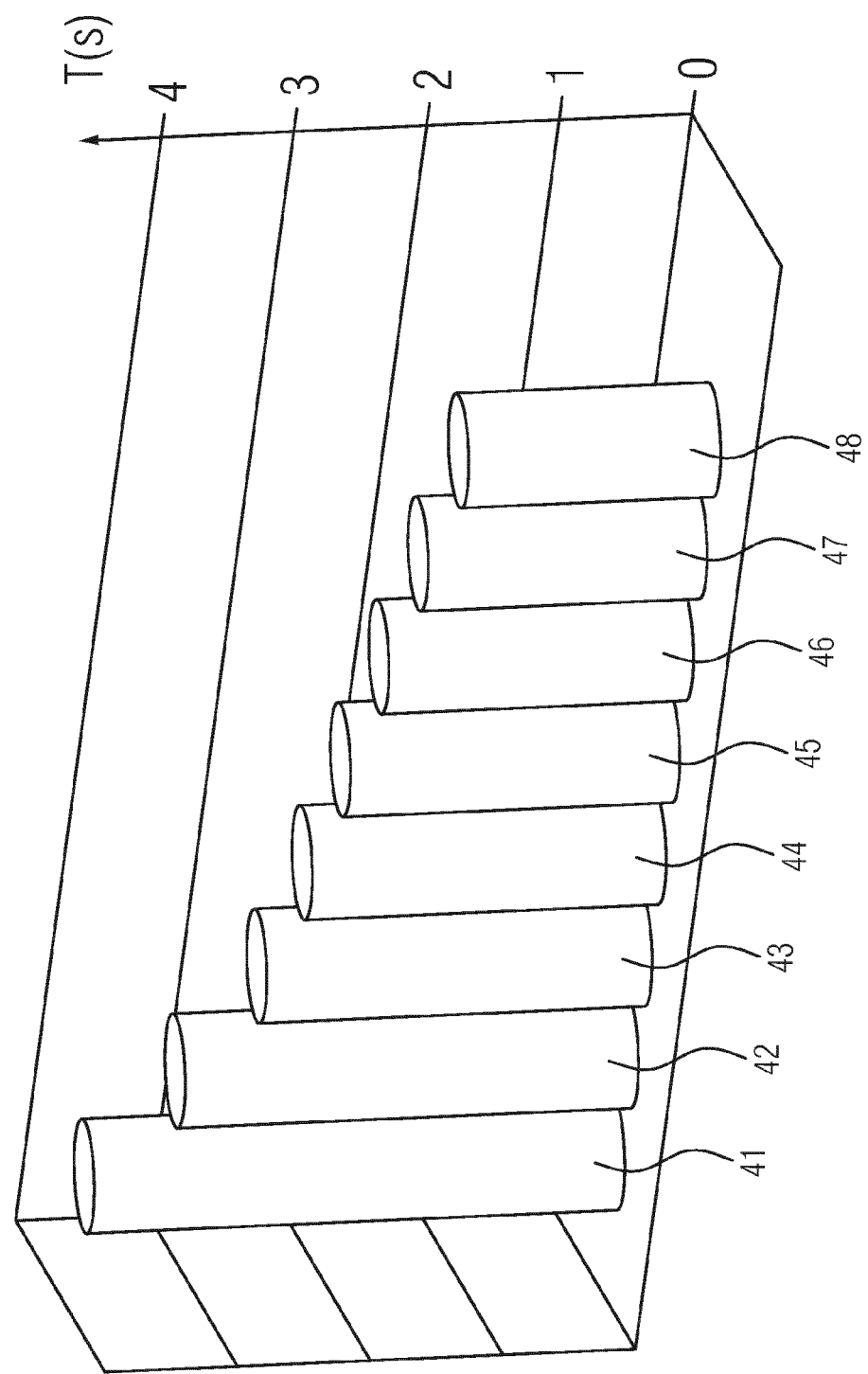
FIG. 3 shows the pressure increase times, according to teachings of the present disclosure.

FIG. 3 shows the pressure increase times for the eight pressure curves known from FIG. 3. The first pressure curve 31 requires a first pressure increase time 41 of 3.69 seconds, which corresponds to a filling level of only 5 liters of fuel in the fuel tank. The second pressure curve 32 requires a second pressure increase time 42 of 3.31 seconds, which corresponds to a filling level of 15 liters of fuel in the fuel tank. The third pressure curve 33 requires a third pressure increase time 43 of 2.65 seconds, which corresponds to a filling level of 25 liters of fuel in the fuel tank.

The fourth pressure curve 34 requires a fourth pressure increase time 44 of 2.39 seconds, which corresponds to a filling level of 30 liters of fuel in the fuel tank. The fifth pressure curve 35 requires a fifth pressure increase time 45 of 2.21 seconds, which corresponds to a filling level of 35 liters of fuel in the fuel tank. The sixth pressure curve 36 requires a sixth pressure increase time 46 of 2.01 seconds, which corresponds to a filling level of 40 liters of fuel in the fuel tank. The seventh pressure curve 37 requires a seventh pressure increase time 47 of 1.84 seconds, which corresponds to a filling level of 45 liters of fuel in the fuel tank. The eighth pressure curve 38 requires an eighth pressure increase time 48 of 1.6 seconds, which corresponds to a filling level of 50 liters of fuel in the fuel tank.

A unique assignment of the measured time required for the build-up of a predetermined pressure in the fuel tank 4 to the filling level present in the fuel tank is thus possible.

The invention claimed is:

1. A system for determining a filling level of a fuel situated in a fuel tank, the system comprising:
    an electromotively driven air pump connected to a fresh air supply;
    an accumulator for storing hydrocarbons given off by the fuel in the fuel tank;
    a first valve disposed in a line upstream of the pump and the accumulator;
    a second valve disposed in a second line between the accumulator and an intake line for the fuel;
    a pressure sensor;
    a control unit; and
    a timing element;
    wherein the control unit is programmed to open the first valve and to close the second valve and subsequently actuate the air pump to increase a pressure in the fuel tank until an upper threshold is reached, wherein actuating the air pump includes operating the air pump at a predefined rotational speed for every determination of the filling level;
    wherein the timing element determines the time required for the pressure to reach the upper threshold; and
    the control unit calculates the filling level of the fuel based on the time taken to reach the upper threshold.

2. The system for determining a filling level of a fuel situated in a fuel tank as claimed in claim 1, wherein the timing element starts timing when the pressure in the fuel tank has exceeded a lower threshold.

3. The system for determining a filling level of a fuel situated in a fuel tank as claimed in claim 1, further comprising a temperature sensor; and wherein the control unit adjusts the determination of the filling level based on a correction coefficient corresponding to a temperature measured by the temperature sensor.

4. The system for determining a filling level of a fuel situated in a fuel tank as claimed in claim 1, further comprising an ambient pressure sensor; and wherein the control unit adjusts the determination of the filling level based on a correction coefficient corresponding to a pressure measured by the ambient pressure sensor.

5. A method for determining a filling level of a fuel situated in a fuel tank, using an electromotively driven air pump connected to a fresh air supply, an accumulator for temporarily storing hydrocarbons given off by the fuel in the fuel tank, a first valve disposed in a line upstream of the pump and the accumulator, a second valve disposed in a second line between the accumulator and an intake line for the fuel, a pressure sensor, a control unit, and a timing element, the method comprising:

closing the first valve and opening the second valve with the control unit such that the fuel tank is closed in pressure-tight fashion from the accumulator;

increasing a pressure in the fuel tank with the air pump until an upper threshold is reached, wherein the air pump operates at a predefined rotational speed for every determination of the filling level;

measuring a time elapsed for the pressure to reach the upper threshold; and determining the filling level of the fuel based on the time required to reach the upper threshold.

6. The method for determining a filling level of a fuel situated in a fuel tank as claimed in claim 5, wherein the timing element starts timing when the pressure in the fuel tank exceeds a lower threshold.

7. The method for determining a filling level of a fuel situated in a fuel tank as claimed in claim 5, further comprising correcting the determination of the filling level based on a temperature correction coefficient.

8. The method for determining a filling level of a fuel situated in a fuel tank as claimed in claim 5, further comprising correcting the determination of the filling level based on an ambient pressure correction coefficient.

* * * * *